April 2, 1957 R. G. BELL 2,787,057
LAWN EDGER
Filed June 23, 1953
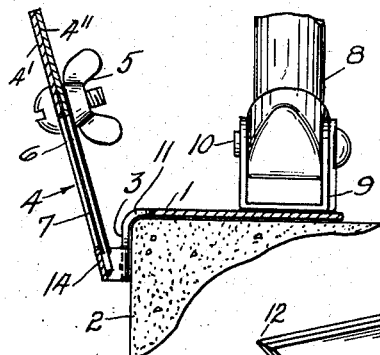
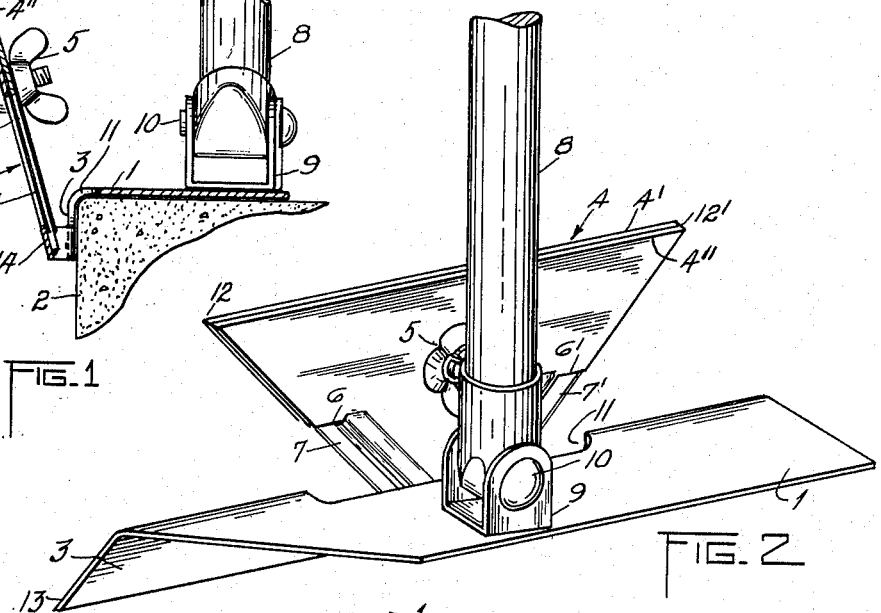
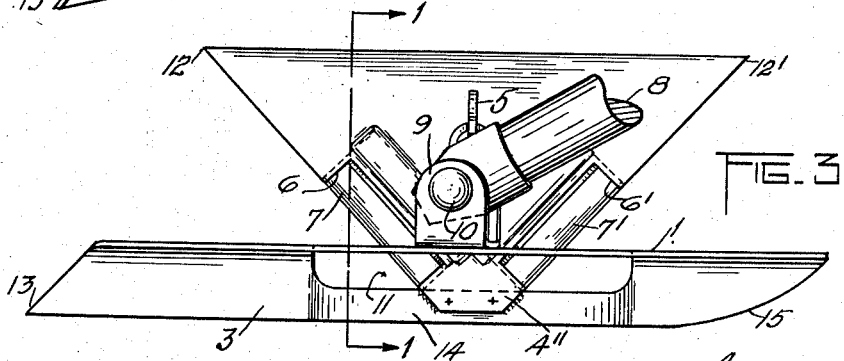
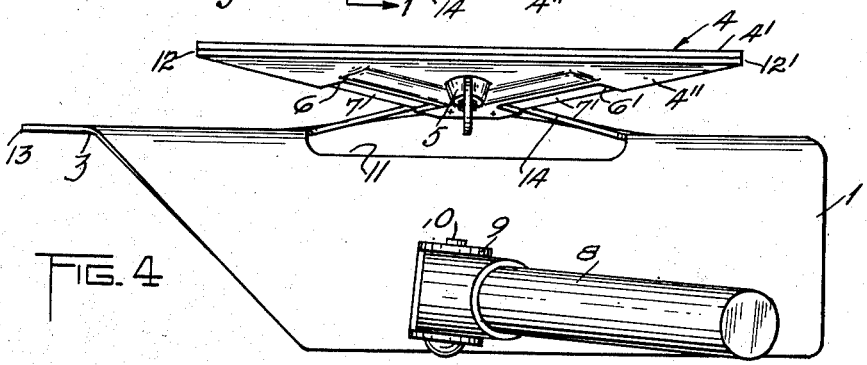
INVENTOR:
Richard Graham Bell
BY
ATTORNEY

United States Patent Office 2,787,057
Patented Apr. 2, 1957

2,787,057

LAWN EDGER

Richard Graham Bell, Miami, Fla., assignor to Bell Industries, Inc., Dade County, Fla., a corporation of Florida Application June 23, 1953, Serial No. 364,425

3 Claims. (Cl. 30—294)

The present invention relates to improvements in lawn edgers and more particularly to a double bladed lawn edger.

The primary object of the invention is to provide a lawn edger having two cutting blades that will operate in either direction, the said cutting blades being easily removable and replaceable.

Another object of the present invention is to provide a lawn edger which will operate easily and require a minimum of force in its operation.

The further object is to provide a lawn edger which will be easily and cheaply manufactured and sturdy and simple in construction.

Other objects and advantages will be apparent to those skilled in the art from the following description taken with the appended drawings, wherein:

Fig. 1 is a front cross section of the lawn edger along the line 1—1 of Fig. 3, constructed in accordance with the teaching of this invention and showing the relative position of the cutting edge and the body of the lawn edger.

Fig. 2 is a perspective view of the lawn edger showing the relative position of the handle and the body and cutting edges of the lawn edger.

Fig. 3 is a side elevation of the same showing the relative position of the parts of the lawn edger.

Fig. 4 is a top plan of the same showing the relative position of the cutting blades of the lawn edger to the main body of the same.

Referring now in greater detail to the drawings wherein a presently preferred embodiment of the invention is shown, the body 1 is shaped to fit right angle curbing 2 by having a dependent member 3 at right angles to the main portion of the body 1, said dependent member being an integral part of body 1.

A blade holder 4 consisting of two parallel plates 4' and 4" is held together by thumb screw 5. These plates 4' and 4" are cut away at 6 and 6' so as to hold removable blades 7 and 7'.

The handle 8 is attached to the main body 1 by flexible means such as stationary lugs 9 and pin 10, the handle 8 being free to rotate in one plane about the pin 10.

As shown particularly in Figs. 1 and 4, the blade holder 4 is at an angle slightly greater than 90° in relation to the horizontal portion of main body 1 and dependent member 3 is bulged outwardly at 14. The inner plate member 4" of the blade holder 4 is welded to the inner face of the bulged portion 14 of the member 3, as shown in Figure 3. Plate member 4' is the removable member of the blade holder, its bottom edge abutting the top edge of the part 14, as shown in Figures 1 and 3. The main body 1 is cut away at 11. The blade holder 4 is shaped at its ends to form two upper points 12 and 12'. The dependent member 3 is pointed at one end 13 and rounded at the other end 15.

In operation the main body of the lawn edger 1 and dependent member 3 fit snugly over a right angle curbing 2. The edger is pushed rapidly back and forth along curbing 2 by the operator by means of handle 8. The point 13 serves to pick up grass which is lying flat and the points 12 and 12' serve to pull down the high grass. Thus both points 13 and 12 and 12' cooperate to feed the grass to the cutting blades 7 and 7'. The aperture 11 cooperates with points 13, 12 and 12' by allowing the grass to drop into the blades 7 and 7' where it is readily cut off.

The blades 7 and 7' are of the replaceable type preferably razor blades of any conventional safety razor type, either two edged or single edged. The blades are replaced when desired by loosening thumb screw 5 separating plates 4' and 4" and removing the old blades and reinserting new blades. When the blades become dull or broken they are discarded and replaced, thus obviating the necessity of sharpening the cutting blade as in most law edgers.

The lawn edger of the present invention has an important feature in that due to the angle of the blade holder 4 relative to the dependent member 3 and main body 1 and the shape of dependent member 3 particularly the outwardly curved or bulged portion 14, this lawn edger does not dig any appreciable amount of dirt from around the curb. Therefore, the only force required is that necessary to actually cut the grass and move the edger along the curbing 2. The angle of the blade holder 4 relative to the horizontal main body 1 is preferably slightly more than 90°.

As the lawn edger is pushed along the curbing 2, the outwardly curved or bulged portion 14 acts to gently shove the sod or earth away from the curbing 2 enough to allow easy and rapid movement of the edger forward and backward along curbing 2. This easy and rapid motion of the edger enables the operator to go over the same piece of grass edge several times in case all the grass is not cut at one stroke. This is possible because the lawn edger of the present invention does not dig up sod or earth to any subsantial extent.

It is apparent that the lawn edger of the present invention is remarkably rugged in construction and yet simple and inexpensive to manufacture and easy to operate and maintain.

It will be obvious to those skilled in the art that various changes may be made without departing from the spirit of the invention and therefore the invention is not limited to what is shown in the drawings and described in the specification, but only as indicated in the appended claims.

I claim:

1. A lawn edger comprising a body member having a depending member integrally joined thereto, said depending member having a blade holder formed integral therewith and extending upwardly therefrom, said blade holder being inclined with respect to said depending member, said blade holder including plates secured together in face-to-face relation, blade elements mounted between said plates, the exposed edges of said blade elements and the surface of said body member defining an acute angle, whereupon movement of said edger causes said blade elements to shear grass coming into contact therewith.

2. A lawn edger comprising a body member having a depending member integrally joined thereto, said depending member being formed with an inclined front edge to define a point, said body member being adapted to engage a level surface and said depending member extending below said level surface and positioned normal thereto, whereby forward movement of said edger causes the point on said depending portion to cut a narrow trench adjacent said level surface, a blade holder integrally joined to said depending member extending upwardly therefrom and being inclined at an angle with respect thereto, said blade holder including a pair of plates secured in face-to-face relation and having blade elements mounted therebetween, the exposed edges of said blade elements defining an acute angle with said body member, whereupon movement of said edger in forwardly and rearwardly directions causes said blades to shear grass contacting the exposed edges of said blade elements.

3. A lawn edger comprising a body member having a depending member integrally joined thereto, a blade holder formed integral with said depending member and extending upwardly therefrom, said blade holder being inclined with respect to said depending member, said blade holder including a pair of parallel plates having blade elements mounted therebetween, the edges of said blade elements being exposed and forming a cutting edge.

References Cited in the file of this patent

UNITED STATES PATENTS

| | | |
|---|---|---|
| 818,510 | Aldrich | Apr. 24, 1906 |
| 1,739,489 | Wagner | Dec. 10, 1929 |
| 1,826,250 | Jensen | Oct. 6, 1931 |
| 2,467,327 | McKee | Apr. 12, 1949 |
| 2,520,463 | Hubner | Aug. 29, 1950 |
| 2,551,899 | Pfeifer et al. | May 8, 1951 |
| 2,587,336 | Larson | Feb. 26, 1952 |